United States Patent [19]

Evitts

[11] Patent Number: 4,825,920
[45] Date of Patent: May 2, 1989

[54] WOOD WORKING TEMPLATE

[76] Inventor: Marcel A. Evitts, 1571 S. State Rd., Ithaca, Mich. 48847

[21] Appl. No.: 194,449

[22] Filed: May 16, 1988

[51] Int. Cl.$^4$ .............................................. B27M 3/00
[52] U.S. Cl. .................................... 144/372; 144/137; 144/144.5; 144/145 R; 409/110; 409/130; 409/137
[58] Field of Search ............... 409/104, 110, 125, 130, 409/97, 137, 179; 144/137, 144 R, 144.5, 145 R, 372

[56] References Cited

U.S. PATENT DOCUMENTS

| | | |
|---|---|---|
| 3,800,842 | 4/1974 | Schell ............................... 144/144.5 |
| 3,838,623 | 10/1974 | Schell . |
| 3,910,327 | 10/1975 | Heckenlaible . |
| 3,967,665 | 7/1976 | Lund . |
| 3,985,168 | 10/1976 | Lundquist . |
| 4,164,249 | 8/1979 | Strub . |
| 4,230,164 | 10/1980 | Mericle . |
| 4,319,615 | 3/1982 | Ditmanson . |
| 4,353,672 | 10/1982 | Smith . |
| 4,567,927 | 2/1986 | Plamann . |
| 4,579,158 | 4/1986 | O'Meara . |
| 4,630,657 | 12/1986 | Obradovich . |

Primary Examiner—W. Donald Bray
Attorney, Agent, or Firm—Harness, Dickey & Pierce

[57] ABSTRACT

The present invention is an apparatus for defining a predetermined cut to be made on a workpiece by a cutting tool. The apparatus includes a backing member for supporting a workpiece and a support member for supporting the backing member on a support surface in relation to the cutting tool. A slide member allows the backing member to slide in relation to the cutting tool and a guide cooperates with the backing member and the slide member for rotation of the object.

14 Claims, 2 Drawing Sheets

WOOD WORKING TEMPLATE

BACKGROUND OF THE INVENTION

1. Field of the Invention

The subject invention relates to a template and, more particularly, to a template for moving a workpiece in a predetermined path for engagement with a cutting tool.

2. Description of Related Art

In the woodworking art, templates and jigs have been developed over the years to fashion workpieces. It is often useful, in the decorative as well as useful arts, to be able to make a design following an elliptical path. Items which can benefit from this design range from gravy boats to picture frames and beyond.

Power hand held routers have become a common woodworking tool capable of making grooves or cuts of precise and decorative designs. The powered hand router is, however, difficult to control. Therefore, the router must be fixed to a support surface. As a result, the workpiece must be moved. This may prevent elliptical cuts from being performed on the workpiece.

It is, therefore, an object of the present invention to provide a method and apparatus for allowing elliptical cuts to be made by a cutting tool on a workpiece.

SUMMARY OF THE INVENTION

Accordingly, the present invention is an apparatus for defining a predetermined cut to be made on an object by a cutting tool. The apparatus includes a backing means for supporting an object and a support means for supporting the backing means on a support surface in relation to the cutting tool. A slide means allows the backing means to slide in relation to the cutting tool and a guide means cooperates with the backing means and the slide means for rotation of the object. The backing means is rotated such that the object travels in a predetermined path to allow the cutting tool to cut the predetermined path in the object.

The present invention provides the advantage of moving a workpiece in relation to a fixedly supported cutting tool to allow elliptical cuts to be made by the cutting tool on the workpiece. The present invention also provides the advantage of allowing various size elliptical cuts to be made by adjusting the relative location between the cutting tool and workpiece.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
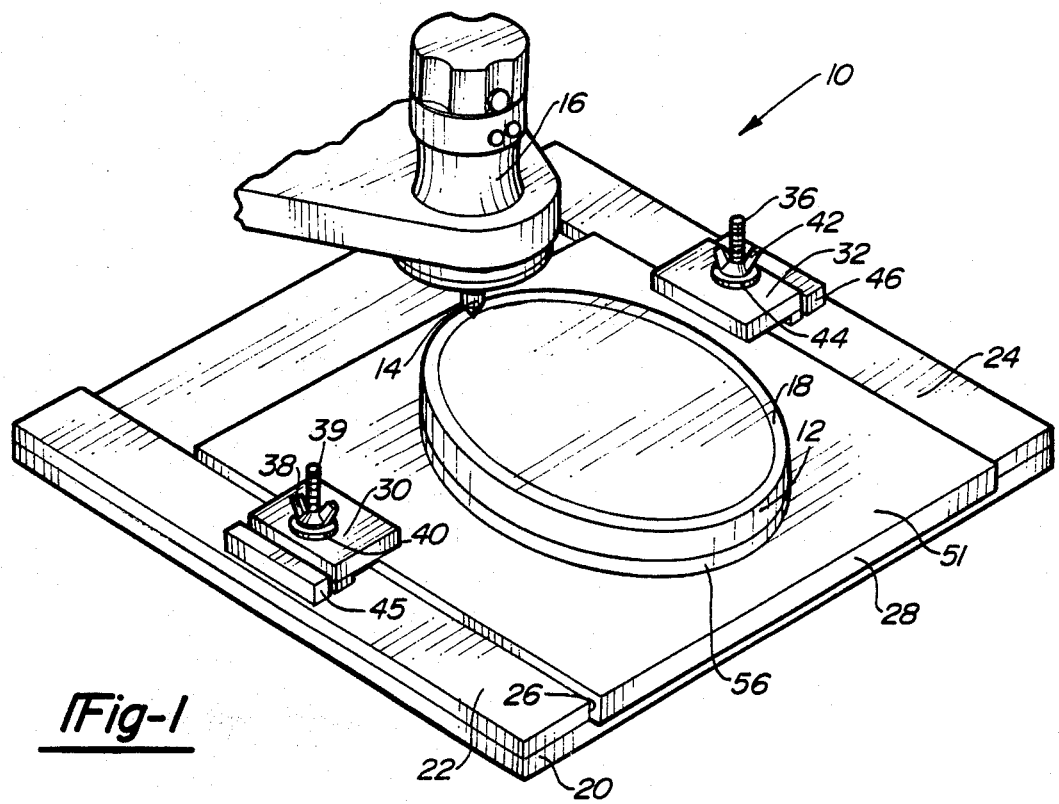
FIG. 1 is a perspective view of the present invention.

Referring to FIG. 1, an apparatus such as a template 10 for wood working is shown. The template 10 supports an object or workpiece 12 made of a material such as wood. The template 10 allows the workpiece 12 to be moved in a predetermined path in relation to a cutting tool 14. The cutting tool 14 may be attached to a router 16 or the like. The router 16 is fixed by a suitable structure (partially shown) to a support surface (not shown). The cutting tool 14 makes a cut or groove 18 in the workpiece 12 according to the path defined by the template 10.

The template 10 includes a mounting member or board 20 which is attached by suitable means to a support surface. The mounting board 20 includes raised sides 22 and 24 to define a channel 26 having a generally rectangular shape. It will be appreciated that the raised sides 22 and 24 may be formed integral with the mounting board 20 or separately and secured by suitable means such as an adhesive to the mounting board 20.

The template 10 also includes a support member or backplate guide 28 having a generally rectangular shape and disposed within the channel 26. The backplate guide 28 is slideable longitudinally in the channel 26. A pair of clamps 30 and 32 secure the backplate guide 28 to the mounting board 20. The clamps 30 and 32 are located on the raised sides 22 and 24, respectively. The clamps 30 and 32 are "L" shaped and have an aperture or orifice (not shown) formed in and communicating through them. Fasteners 34 and 36 extend through an aperture or orifice (not shown) formed in and communicating through the mounting board 20 and raised sides 22 and 24, respectively. The clamps 30 and 32 are disposed about the fasteners 34 and 36, respectively, through their respective apertures. A wing nut 38 and washer 40 are used with the fastener 34 to secure the clamp 30 to the raised side 22. Similarly, a wing nut 42 and washer 44 are used with the fastener 36 to secure the clamp 32 to the raised side 24. The wing nuts 38 and 42 may be loosened to adjust the backplate guide 28 by sliding it along the channel 26 and then re-tightened down the clamps 30 and 32 to secure the backplate guide 28 in place relative to the cutting tool 14. It will be appreciated, however, that other suitable means could be used to secure the backplate guide 28 to the mounting board 20 and allow the relative location between the backplate guide 28 and the cutting tool 14 to be adjusted. A pair of stops 45 and 46 are secured to the raised sides 22 and 24, respectively, by suitable means such as an adhesive to prevent rotation of the clamps 30 and 32 about the fasteners 34 and 36, respectively.

The backplate guide 28 has a channel 48 formed in it. The channel 48 extends in the same longitudinal direction as the channel 26 and is generally rectangular with arcuate ends. The backplate guide 28 includes a dowel or pin member 50 spaced longitudinally a predetermined distance from one end of the channel 48. The pin member 50 extends above the generally planar surface 51 of the backplate guide 28.

The template 10 further includes a slide guide 52 having a generally rectangular shape with arcuate ends. The slide guide 52 is disposed within the channel 48 and slides freely within it. The slide guide 52 has a protrusion 54 in the shape of a dowel and extends above the generally planar surface 51 of the backplate guide 28 when the slide guide 52 is within channel 48.

Figure 2:
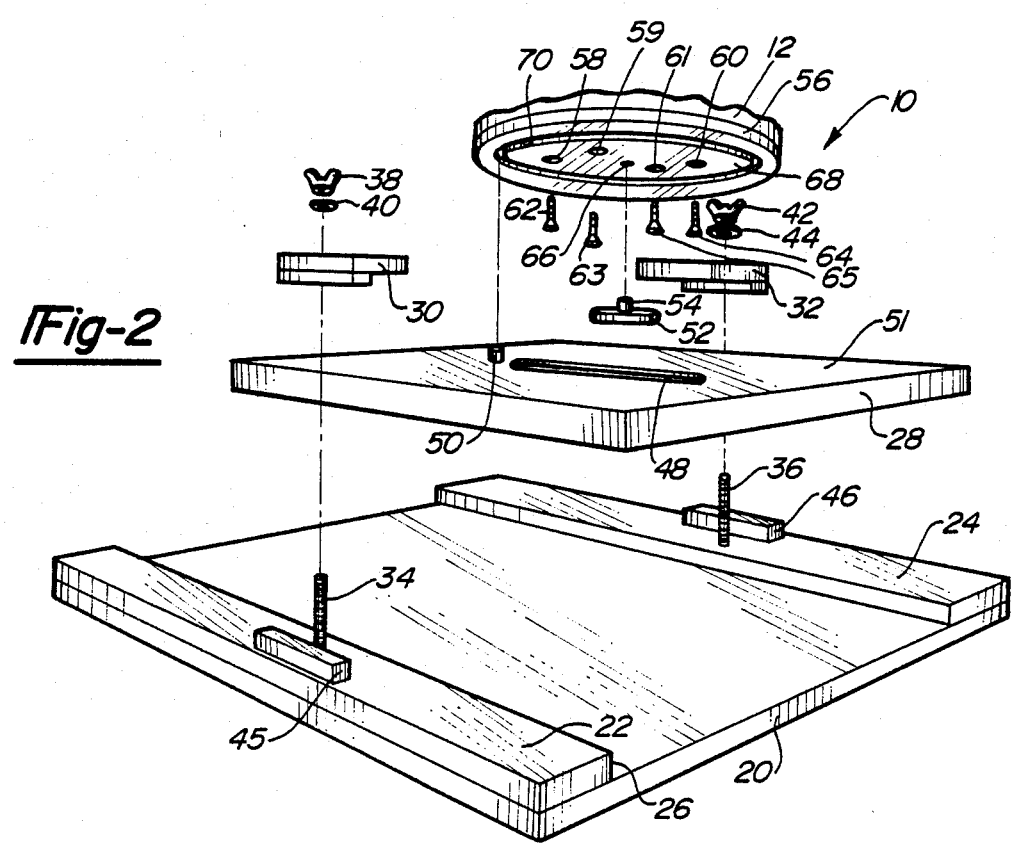
FIG. 2 is an exploded perspective view of the present invention of FIG. 1.
Figure 4:
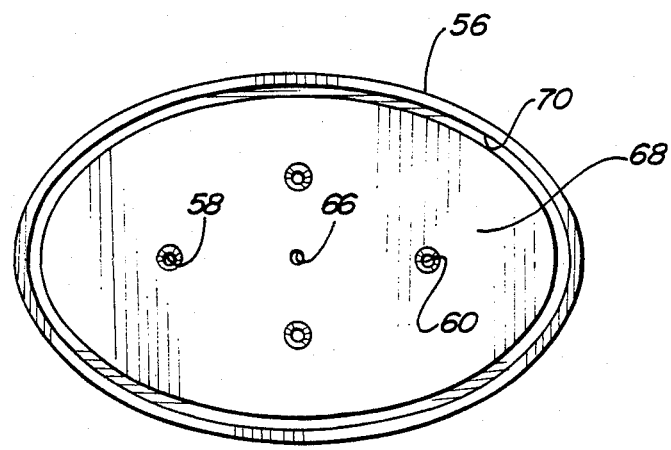
FIG. 4 is a bottom view of the backing member of FIG. 3.

The template 10 includes a backing member or backplate 56 having a generally elliptical or oval shape. The backplate 56 has at least two, preferably four, apertures 58, 59, 60 and 61 extending or communicating through it. The apertures 58, 59, 60 and 61 are preferably countersunk to allow fasteners 62, 63, 64 and 65 such as screws to extend through the apertures 58, 59, 60 and 61, respectively, and secure the workpiece 12 to the backplate 56. The fasteners 62, 63, 64 and 65 are at least flush or countersunk into the backplate 56. The backplate 56 also has a bore 66 centrally located in the generally planar bottom surface 68 of the backplate 56. The bore 66 is disposed about the protrusion 54 of the slide guide 52. The bore 66 is also oversized to allow the backplate 56 to rotate freely about the protrusion 54. The backplate 56 further includes a channel 70 in a predetermined path about the backplate 56 as illustrated in FIGS. 2 and 4. The predetermined path of the channel 70 is preferably elliptical or oval shaped and is disposed about the pin member 50 of the backplate guide 28. The channel 70 is oversized to allow the channel 70 to move freely about the pin member 50. The channel 70 also has a depth to allow the bottom surface 68 to be substantially flush or planar with the generally planar surface 51 of the backplate guide 28.

Additionally, the present invention provides a method for making a predetermined cut on the workpiece 12 as below-described. The operator secures the workpiece 12 to the backplate 56 with the fasteners 62, 63, 64 and 65 extending through the apertures 58, 59, 60 and 61 of the backplate 56. The slide guide 52 is disposed in the channel 48 of the backplate guide 28. The operator locates the protrusion 54 of the slide guide 52 with the bore 66 of the backplate 56 and the pin member 50 of the backplate guide 28 with the channel 70 of the backplate 56. The bottom surface 68 of the backplate 56 is then placed upon the planar surface 51 of the backplate guide 28 such that the protrusion 54 is disposed in the bore 66 and the pin member 50 is disposed in the channel 70.

The operator then slides the backplate guide 28 along the channel 26 of the mounting board 20 until the cutting tool 14 of the router 16 is aligned with the workpiece 12 to make a desired cut or groove 18 into the workpiece 12. The wing nuts 38 and 42 are threaded on the fasteners 34 and 36 and are secured or tightened down on the clamps 30 and 32, respectively, to secure the backplate guide 28 in place on the mounting board 20.

Figure 3:
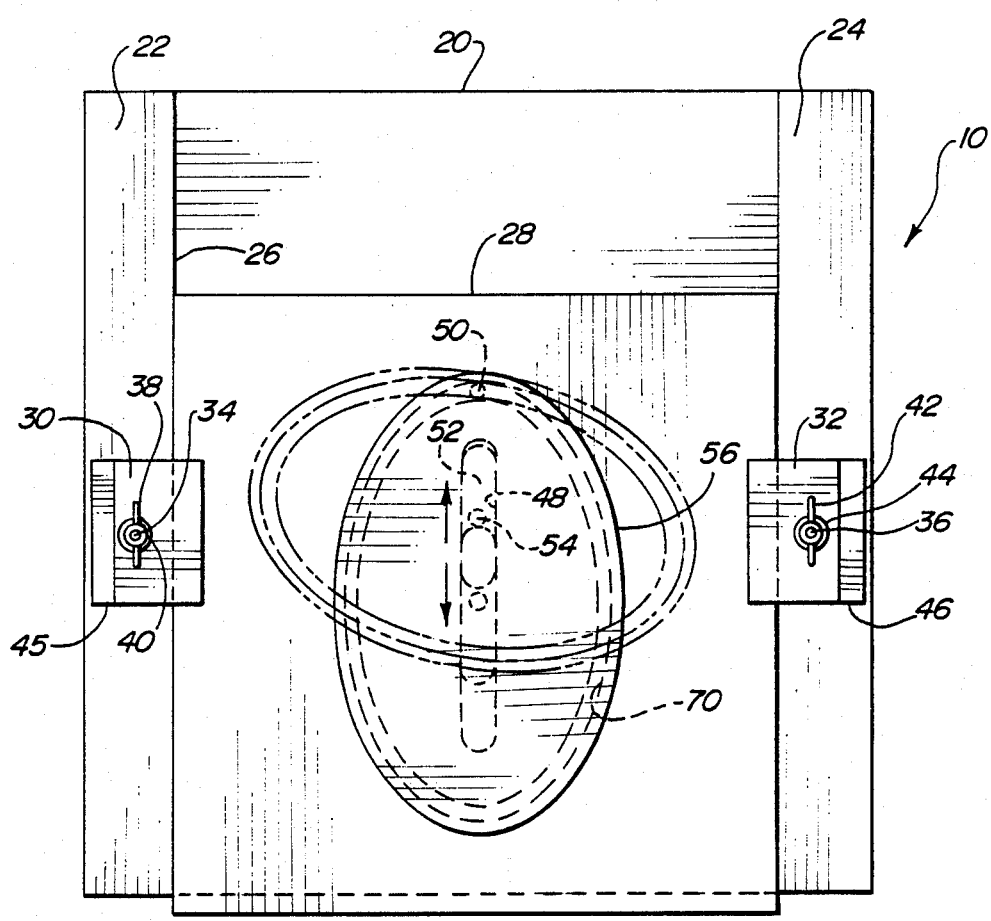
FIG. 3 is a plan view of the present invention illustrating various positions of a backing member.

Once the cutting tool 14 is rotating, due to electrical power received by the router 16, the operator rotates the backplate 56. As the backplate 56 is rotated, the channel 70 follows the pin member 50, while the slide guide 52 follows channel 48. Thus, the two act as a cam moving the backplate 56 longitudinally toward and away from the cutting tool 14 along the predetermined path defined by the channel 70 as illustrated in FIG. 3. Once a design is cut into the workpiece 12, an inner elliptical portion is cut out to leave the workpiece 12 in the form of an elliptical frame.

The present invention has been described in an illustrative manner. It is to be understood that the terminology which has been used is intended to be in the nature of words of description rather than of limitation.

Obviously, many modifications and variations of the present invention are possible in light of the above teachings. Therefore, the present invention may be practiced otherwise then as specifically described.

What is claimed is:

1. An apparatus for defining a predetermined cut to be made on an object by a cutting tool, said apparatus comprising:
    backing means for supporting an object;
    support means for supporting said backing means on a support surface in relation to the cutting tool;
    slide means for allowing said backing means to slide in relation to the cutting tool;
    guide means cooperating with said backing means and said slide means for rotation of the object in a predetermined path;
    whereby the backing means is rotated such that the object travels in the predetermined path to allow the cutting tool to make the predetermined cut in the object; and
    said guide means comprising a pin member secured to said support means and extending above a generally planar surface of said support means, and means forming a first channel of said predetermined path in said backing means, said pin member being disposed in said first channel.

2. An apparatus as set forth in claim 1 wherein said support means comprises a backplate guide having means forming a second channel in said backplate guide.

3. An apparatus as set forth in claim 2 wherein said slide means comprises a slide member disposed in said second channel and being slideable therein.

4. An apparatus as set forth in claim 1 wherein said backing means comprises a backing member having said first channel formed in said predetermined path.

5. An apparatus as set forth in claim 4 wherein said backing member includes means defining a bore.

6. An apparatus as set forth in claim 3 wherein said slide member includes a projection extending outwardly from said slide member and being disposed in said bore to allow rotation of said backing member about said male projection.

7. An apparatus as set forth in claim 4 including fastening means for removably fastening the object to said backing member.

8. An apparatus as set forth in claim 2 including a mounting member having means forming a third channel in said mounting member, said backplate guide being disposed in said third channel.

9. An apparatus as set forth in claim 8 including adjustment means for removably securing said support means within said channel of said mounting board and for allowing adjustment of the location of support member in relation to the cutting tool.

10. An apparatus as set forth in claim 9 wherein said adjustment means comprises a clamp on opposite sides of said third channel, and a second fastening means for removably securing said clamp to said mounting member.

11. An apparatus as set forth in claim 10 including a pair of stops, one for each of said clamps, secured to said mounting member to prevent rotation of said clamp.

12. An apparatus as set forth in claim 11 wherein said first channel is elliptical in shape.

13. An apparatus for defining a predetermined cut to be made on a workpiece by a cutting tool, said apparatus comprising a:
    backplate for supporting a workpiece, said backplate having said first channel formed in said predetermined path and including means defining a bore;
    backplate guide for supporting said backplate on a support surface in relation to the cutting tool, said backplate guide having means forming a second channel in said backplate guide;
    slide member for allowing said backplate to slide in relation to the cutting tool, said slide member being disposed in said second channel and slideable therein, said slide member including a projection extending outwardly from said slide member and being disposed in said bore to allow rotation of said backplate about said projection;

guide means cooperating with said backplate and said slide member for rotation of the workpiece in a predetermined path, said guide means comprising a pin member secured to said backplate guide and extending above a generally planar surface of said backplate guide, and means forming a first channel of said predetermined path in said backplate, said pin member being disposed in said first channel;

fastening means for removably fastening the workpiece to said backplate;

a mounting member having means forming a third channel in said mounting member, said backplate guide being disposed in said third channel;

a pair of clamps, one each on opposite sides of said third channel for removably securing said backplate guide within said channel of said mounting board and for allowing adjustment of the location of support member in relation to the cutting tool;

a second fastening means for removably securing said clamp to said mounting member; and a pair of stops, one for each of said clamps, secured to said mounting member to prevent rotation of said clamp, and whereby the backplate is rotated such that the workpiece travels in the predetermined path to allow the cutting tool to make the predetermined cut in the workpiece.

14. A method for making a predetermined cut on a workpiece by a cutting tool, said method comprising the steps of:

securing a workpiece to a backplate with fasteners;

locating a protrusion of a slide guide disposed in a channel of a backplate guide with a bore of the backplate;

locating a pin member of the backplate guide with a channel formed in the backplate;

placing the backplate upon the backplate guide such that the protrusion is disposed in the bore and the pin member is disposed in the channel; and rotating the workpiece to allow the cutting tool to make a predetermined cut in the workpiece.

* * * * *